(12) United States Patent
Groeschel (10) Patent No.: US 7,290,455 B2
(45) Date of Patent: Nov. 6, 2007

(54) DRIVER CONFIGURATION FOR AN ULTRASONIC FLOW METER

(75) Inventor: Keith V. Groeschel, Houston, TX (US)

(73) Assignee: Daniel Measurement and Control, Inc., Houston, TX (US)

(*) Notice: Subject to any disclaimer, the term of this patent is extended or adjusted under 35 U.S.C. 154(b) by 20 days.

(21) Appl. No.: 11/361,107

(22) Filed: Feb. 24, 2006

(65) Prior Publication Data

US 2007/0039399 A1 Feb. 22, 2007

Related U.S. Application Data

(60) Provisional application No. 60/710,323, filed on Aug. 22, 2005.

(51) Int. Cl.
*G01F 1/66* (2006.01)
(52) U.S. Cl. .................................. 73/861.28
(58) Field of Classification Search .............. None
See application file for complete search history.

(56) References Cited

U.S. PATENT DOCUMENTS

| | | | | | |
|---|---|---|---|---|---|
| 3,715,709 | A | * | 2/1973 | Zacharias et al. ............ 367/95 |
| 4,162,630 | A | * | 7/1979 | Johnson .................... 73/861.27 |
| 4,164,865 | A | * | 8/1979 | Hall et al. ................ 73/861.28 |
| 4,262,545 | A | * | 4/1981 | Lamarche et al. ........ 73/861.27 |
| 4,408,589 | A | * | 10/1983 | Hauler et al. ................ 123/494 |
| 4,630,482 | A | * | 12/1986 | Traina ......................... 73/597 |
| 4,787,252 | A | * | 11/1988 | Jacobson et al. ......... 73/861.28 |
| 4,914,959 | A | * | 4/1990 | Mylvaganam et al. ... 76/861.28 |
| 5,117,698 | A | * | 6/1992 | Baumoel .................. 73/861.28 |
| 6,298,735 | B1 | * | 10/2001 | Dias et al. ................ 73/861.29 |
| 6,305,233 | B1 | * | 10/2001 | Braathen et al. ......... 73/861.28 |
| 6,435,037 | B1 | * | 8/2002 | Doten ..................... 73/861.27 |
| 6,595,071 | B1 | * | 7/2003 | Doten ..................... 73/861.29 |
| 6,606,916 | B2 | * | 8/2003 | Bignell et al. ........... 73/861.27 |

* cited by examiner

*Primary Examiner*—Harshad Patel
(74) *Attorney, Agent, or Firm*—Conley Rose, P.C.; Mark E. Scott (57) ABSTRACT

A method and system for driver configuration for an ultrasonic meter. At least some of the illustrative embodiments are ultrasonic meters comprising a spool piece that couples within a flow of fluids, a first upstream transducer mechanically coupled to the spool piece, a first downstream transducer mechanically coupled to the spool piece (the first downstream transducer in operational relationship to the first upstream transducer), and a first transducer driver that selectively couples to the first upstream and first downstream transducers. The transducer driver drives the first upstream transducer, and also drives the first downstream transducer.

10 Claims, 6 Drawing Sheets

DRIVER CONFIGURATION FOR AN ULTRASONIC FLOW METER

CROSS REFERENCE TO RELATED APPLICATIONS

This specification claims the benefit of Provisional Application Ser. No. 60/710,323, filed Aug. 22, 2005, titled "Single driver configuration for ultrasonic flow meter," which application is incorporated by reference herein as if reproduced in full below.

STATEMENT REGARDING FEDERALLY SPONSORED RESEARCH OR DEVELOPMENT

Not Applicable.

BACKGROUND OF THE INVENTION

1. Field of the Invention

Various embodiments of the invention relate to ultrasonic flow meters. More particularly, various embodiments of the invention related to driver configurations for reducing transit time errors in measurement of ultrasonic signals of an ultrasonic flow meter.

2. Description of the Related Art

Ultrasonic flow meters are a class of flow meters that determine volumetric flow of a fluid within a conduit using ultrasonic signals propagated through the fluid. For example, an ultrasonic flow meter may measure the transit time of an upstream traveling ultrasonic signal along a particular path, measure transit time of a downstream traveling ultrasonic signal along the path. From these measurements, a "delta time" is determined as the difference between the upstream and downstream transit times. From the delta time, the average flow rate of the fluid may be determined, and from the flow rate a volumetric flow may be calculated. Thus, measuring an accurate delta time is important to determining an accurate flow rate.

The measured transit time of an ultrasonic signal between a transducer pair has at least two major components: an "actual time of flight" of the ultrasonic signal in the fluid between the faces of the transducers; and a "delay time" that comprises the difference between the measured transit time and the actual time of flight. Delay time may thus encompass: propagation delays between a control processor and the transducer drivers; propagation delay between transducer drivers and the transducers as transmitters; propagation delays between transducers as receivers and the receiving electronics; propagation delays between the receiving electronics and the processor; and delays associated with control electronics with finite response times attempting to measure elapsed time. In ultrasonic meters measuring flow of gaseous fluids, the delay time may have a small effect in the overall fluid flow calculations. However, in ultrasonic meters measuring flow in fluids with high density, such as liquids, the delay time may have a large effect.

Thus, a system which reduces errors associated delay time variables would be desirable.

SUMMARY

The problems noted above are solved in large part by a method and system for driver configuration for an ultrasonic meter. At least some of the illustrative embodiments are ultrasonic meters comprising a spool piece that couples within a flow of fluids, a first upstream transducer mechanically coupled to the spool piece, a first downstream transducer mechanically coupled to the spool piece (the first downstream transducer in operational relationship to the first upstream transducer), and a first transducer driver that selectively couples to the first upstream and first downstream transducers. The transducer driver drives the first upstream transducer, and also drives the first downstream transducer.

Other illustrative embodiments are methods comprising driving a first transducer with a first transducer driver to create a first acoustic signal in a fluid, receiving the first acoustic signal at a second transducer, driving the second transducer with the first transducer driver to create a second acoustic signal in the fluid, and receiving the second signal at the first transducer.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a more detailed description of embodiments of the invention, reference will now be made to the accompanying drawings, wherein.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

"Delay time" shall mean the difference in time between the measured transit time of an ultrasonic signal and the actual flight time of the ultrasonic signal.

DETAILED DESCRIPTION

Figure 1A:
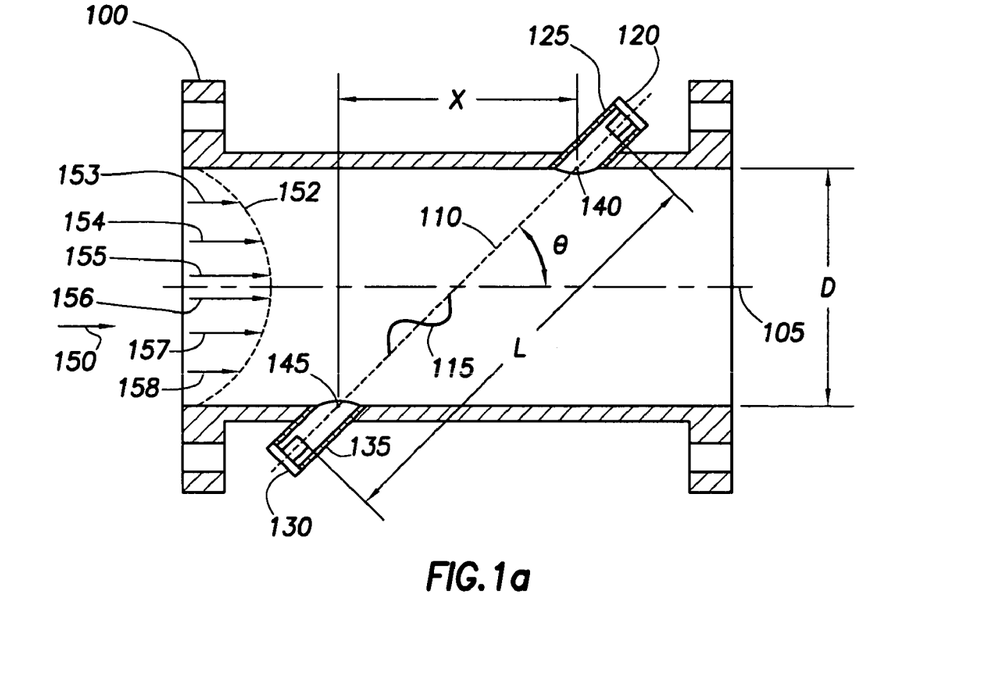
FIG. 1A is a cut-away top view of an ultrasonic gas flow meter.

FIG. 1A shows an ultrasonic meter suitable for measuring fluid flow, such as liquids, in accordance with embodiments of the invention. Spool piece 100, suitable for placement between sections of a pipeline, has a predetermined size and defines a measurement section. A pair of transducers 120 and 130, and their respective housings 125 and 135, are located along the length of spool piece 100. Transducers 120 and 130 are preferably ultrasonic transceivers, meaning that they both generate and receive ultrasonic signals. "Ultrasonic" in this context refers to acoustic signals, in some embodiments having frequencies above about 20 kilohertz. In some embodiments, the ultrasonic signals may have a frequency of approximately 125 kilo-Hertz (for gas meters), and 1 mega-Hertz (for liquid meters). Regardless of the frequency, these signals may be generated and received by a piezoelectric element in each transducer. To generate an ultrasonic signal, the piezoelectric element is stimulated electrically, and it responds by vibrating. The vibration of the piezoelectric element generates an ultrasonic signal that travels across the spool piece through the fluid to the corresponding transducer of the transducer pair. Upon being struck by an ultrasonic signal, the receiving piezoelectric element vibrates and generates an electrical signal that is detected, digitized, and analyzed by electronics associated with the meter.

A path 110, sometimes referred to as a "chord," exists between transducers 120 and 130 at an angle θ to a centerline 105. The length of "chord" 110 is the distance between the face of transducer 120 to the face of transducer 130. Points 140 and 145 define the locations where acoustic signals generated by transducers 120 and 130 enter and leave fluid flowing through the spool piece 100. The position of transducers 120 and 130 may be defined by the angle θ, by a first length L measured between transducers 120 and 130, a second length X corresponding to the axial distance between points 140 and 145, and a third length D corresponding to the pipe diameter. In most cases distances D, X and L are precisely determined during meter fabrication. Further, transducers such as 120 and 130 are usually placed a specific distance from points 140 and 145, respectively, regardless of meter size (i.e. spool piece diameter).

Initially, downstream transducer 120 generates an ultrasonic signal that propagates to and strikes the upstream transducer 130. Some time later, the upstream transducer 130 generates a return ultrasonic signal that propagates to and strikes the downstream transducer 120. Thus, the transducers 120 and 130 play "pitch and catch" with ultrasonic signals 115 along chordal path 110. During operation, this sequence may occur thousands of times per minute for each transducer pair.

A fluid flows in the spool piece 100 in a direction 150 with a velocity profile 152. Velocity vectors 153-158 illustrate that the velocity through spool piece 100 increases toward centerline 105. The transit time of the ultrasonic wave 115 between transducers 120 and 130 depends in part upon whether the ultrasonic signal 115 is traveling upstream or downstream with respect to the fluid flow. The transit time for an ultrasonic signal traveling downstream (i.e. in the same direction as the flow) is less than the transit time when traveling upstream (ie. against the flow). The upstream and downstream transit times can be used to calculate the average velocity along the signal path, and may also be used to calculate the speed of sound in the fluid flow. Given the cross-sectional measurements of the meter carrying the fluid and the average velocity, the volume of fluid flowing through the spool piece 100 may be calculated.

Figure 1B:
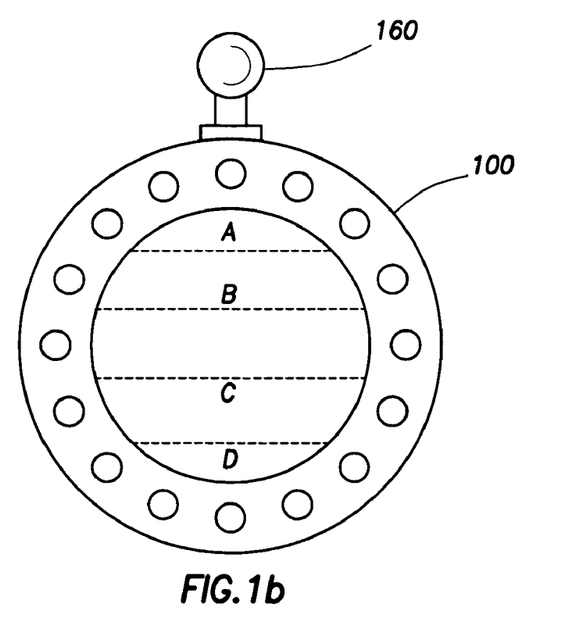
FIG. 1B is an end view of a spool piece including chordal paths A-D.

To more precisely determine the average velocity over the meter cross-section, ultrasonic flow meters a plurality of paths. FIG. 1B illustrates a multi-path ultrasonic flow meter. In these embodiments spool piece 100 comprises four chordal paths A, B, C, and D at varying levels through the fluid flow. Each chordal path A-D corresponds to two transducers behaving alternately as a transmitter and receiver. Also shown are control electronics 160, which acquires and processes the data from the four chordal paths A-D. Hidden from view in FIG. 1B are the four pairs of transducers that correspond to chordal paths A-D.

Figure 1C:
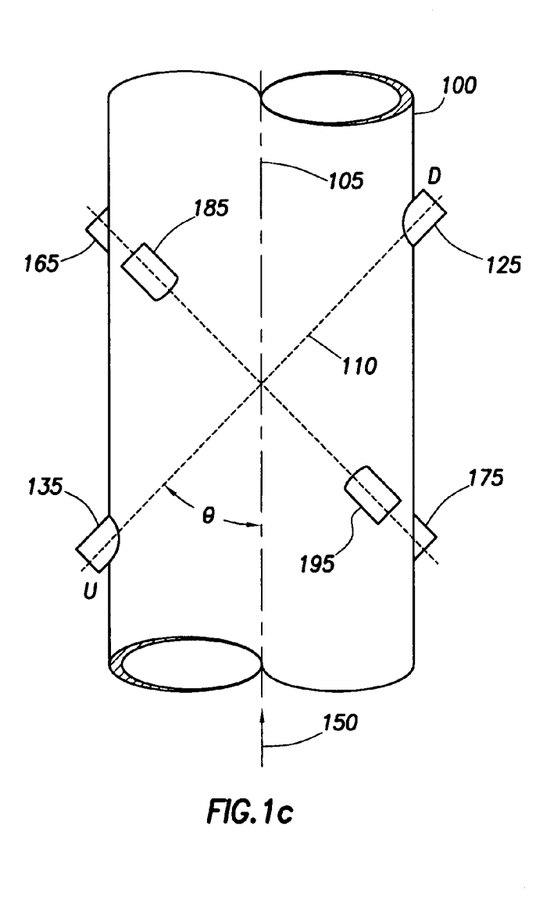
FIG. 1C is a top view of a spool piece housing transducer pairs.

The arrangement of the four pairs of transducers may be more easily understood by reference to FIG. 1C. Four pairs of transducer ports are mounted on spool piece 100. Each pair of transducer ports corresponds to a single chordal path of FIG. 1 B. The spool piece 100 has mounted thereon a first pair of transducer ports 125 and 135 including associated transducers. Another pair of transducer ports comprising ports 165 and 175 (only partially in view) including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level" (i.e. a different radial position in the pipe or meter spool piece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an X, and the lower two pairs of transducers corresponding to chords C and D also form an X. The flow velocity of the fluid may be determined at each chord A-D to obtain chordal flow velocities, and the chordal flow velocities are combined to determine an average flow velocity over the entire pipe.

Figure 2:
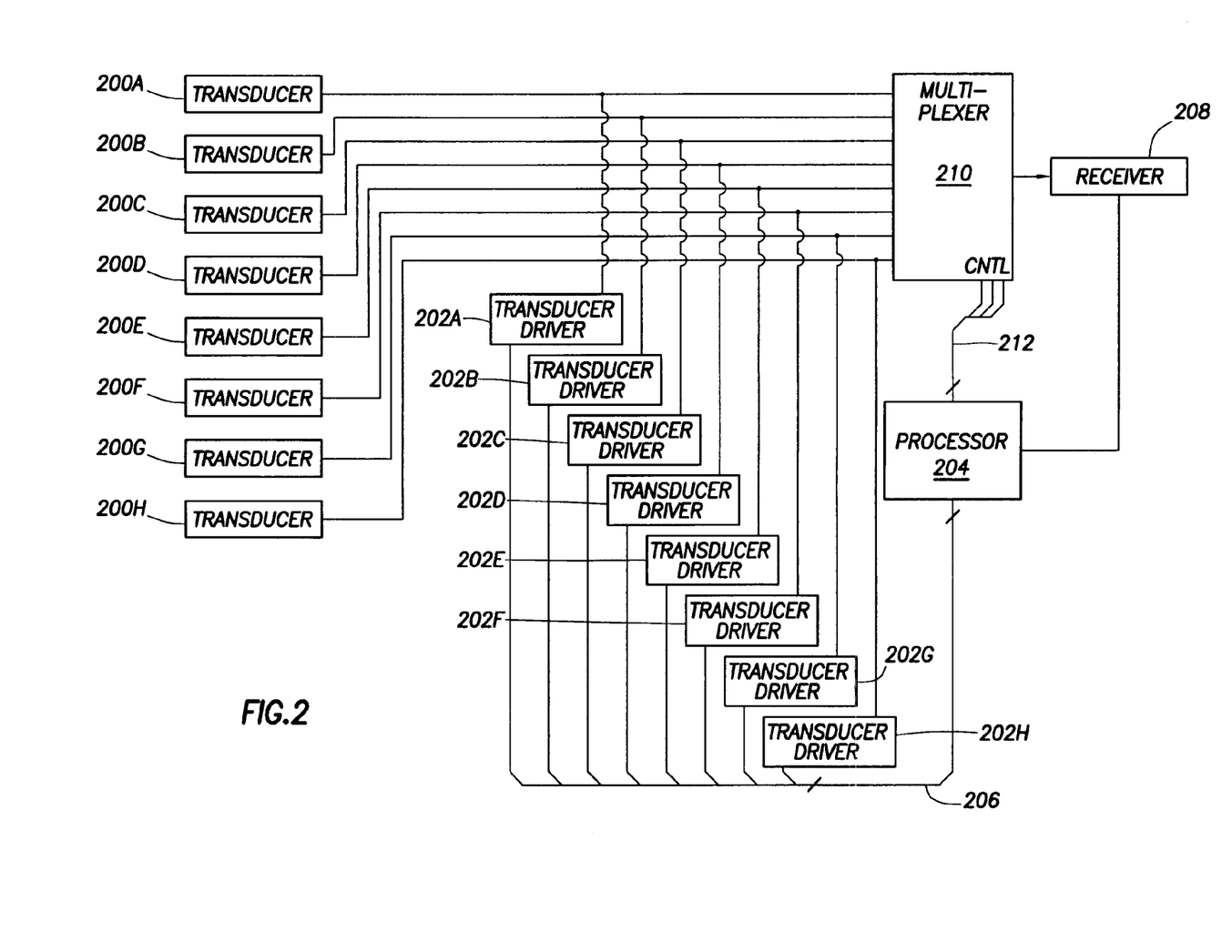
FIG. 2 illustrates a multiple-transducer, multiple-driver configuration of an ultrasonic flow meter.

FIG. 2 shows an electrical block diagram of a multiple-transducer, multiple-driver configuration ultrasonic flow meter. In particular, the figure illustrates a plurality of transducers 200A-200H. Each transducer is coupled to its respective transducer driver 202A-202H. During the period of time when a transducer 200 acts to generate ultrasonic signals, the transducer's respective transducer driver 202 is the driver circuit responsible for providing the exciting signal. The processor 204 selectively enables each transducer driver 202 by way of enable signal lines 206. During the period of time when a transducer 200 acts as a receiver to receive ultrasonic signals, the respective transducer driver 202 is disabled by the processor 204, and the transducer 200 is coupled to the receiver circuit 208 through 1 to N multiplexer 210. The processor 204 may control the multiplexer 210 by way of a plurality of control signal lines 212.

Still referring to FIG. 2, the inventor of the present specification has found that, in spite of similarity of the circuits that form the transducer drivers, each transducer driver 202 may have different characteristics that result in different delay time. The variances in delay time as among the plurality of transducer drivers 202 may be, in some situations, on the order of 50 nanoseconds. This transducer driver delay time variation can result in a significant timing difference between the upstream and downstream paths, especially in ultrasonic flow meters used in liquid measurement applications.

Figure 3A:
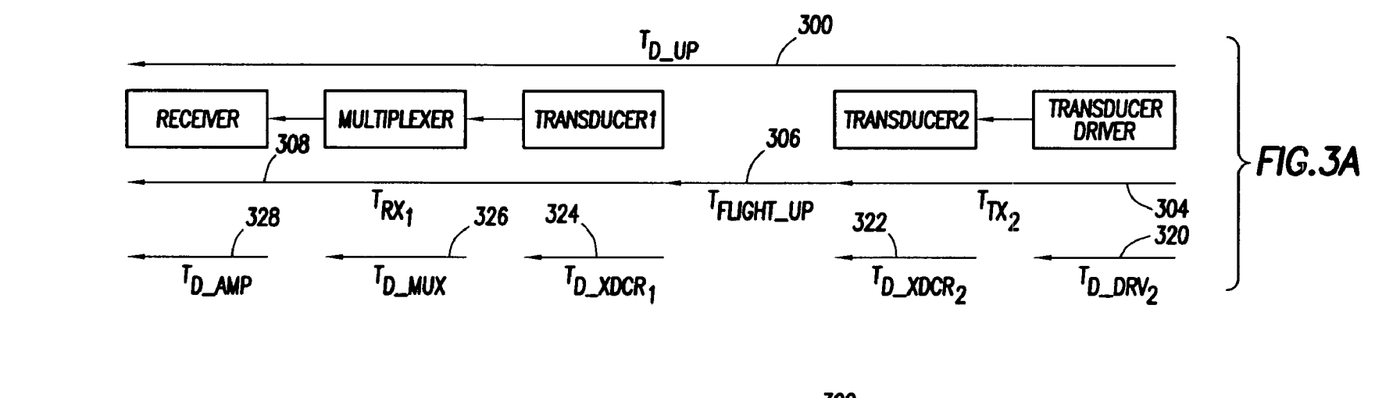
FIGS. 3A and 3B are graphical representations of signal propagation in an ultrasonic meter.
Figure 3B:
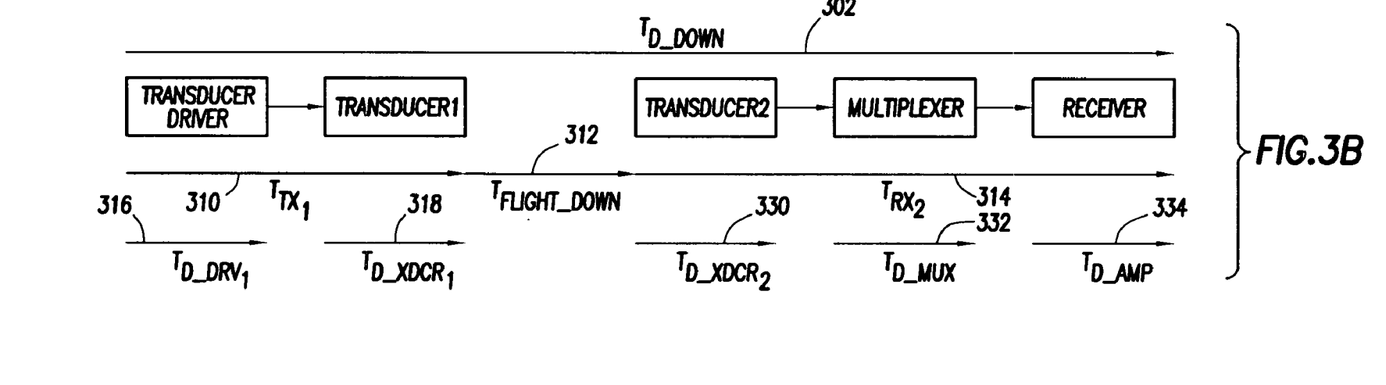

Consider, for purposes of explanation, a pair of transducers in an ultrasonic meter each having their own transducer driver. Further consider that transducer 1 is upstream and transducer 2 is downstream relative to the flow direction. With those conditions in mind, Delta Time may be mathematical stated as:

$$\text{Delta Time} = T_{D\_UP} - T_{D\_DOWN} \quad (1)$$

where $T_{D\_UP}$ is the upstream measured transit time, and $T_{D\_DOWN}$ is the downstream measured transit time. FIG. 3A shows graphically a transducer pair and related electronics for upstream signal propagation, and correspondingly illustrates $T_{D\_UP}$ by arrow 300. FIG. 3B shows graphically the transducer pair and related electronics for downstream signal propagation, and correspondingly illustrates $T_{D\_DOWN}$ by arrow 302. As illustrated in FIGS. 3A and 3B, the upstream and downstream measured transit times comprise several components. For upstream propagation:

$$T_{D\_UP} = T_{TX2} + T_{FLIGHT\_UP} + T_{RX1} \quad (2)$$

where $T_{TX2}$ is the delay time component associated with the transmit path for transducer 2 (illustrated as arrow 304); $T_{FLIGHT\_UP}$ is the actual time of flight of the upstream traveling ultrasonic signal (illustrated as arrow 306); and $T_{RX1}$ is the delay time component associated with the receive path for transducer 1 (illustrated as arrow 308). Similarly:

$$T_{D\_DOWN} = T_{TX1} + T_{FLIGHT\_DOWN} + T_{RX2} \quad (3)$$

where $T_{TX1}$ is the delay time component associated with transmit path for transducer 1 (illustrated as arrow 310 in FIG. 3B); $T_{FLIGHT\_DOWN}$ is the actual time of flight of the downstream traveling ultrasonic signal (illustrated as arrow 312); and $T_{RX2}$ is the delay time component associated with the receive path for transducer 2 (illustrated as arrow 314).

The transmit and receive path component of the delay time may comprise multiple components as well. Consider first the transmit path for the downstream measurement illustrated by FIG. 3B:

$$T_{TX1} = T_{D\_DRV1} + T_{D\_XDCR1} \quad (4)$$

where $T_{D\_DRV1}$ is the delay time component associate with the logic delay and exciting signal delay through the driver for transducer 1 (illustrated as arrow 316); and $T_{D\_XDCR1}$ is the delay time component associate with the signal delay through transducer 1 (illustrated as arrow 318). Similarly for the transmit path for the upstream measurement illustrated by FIG. 3A:

$$T_{TX2} = T_{D\_DRV2} + T_{D\_XDCR2} \quad (5)$$

where $T_{D\_DRV2}$ is the delay time component associated with logic delay and exciting signal delay through the driver for transducer 2 (illustrated as arrow 320); and $T_{D\_XDCR2}$ is the delay time component associate with the signal delay through transducer 2 (illustrated as arrow 322). Likewise for receive paths, starting with the upstream measurement:

$$T_{RX1} = T_{D\_XDRC1} + T_{D\_MUX} + T_{D\_AMP} \quad (6)$$

where $T_{D\_XDRC1}$ is the delay time component associated with the signal delay through transducer 1 (illustrated by arrow 324 of FIG. 3A); $T_{D\_MUX}$ is the delay time component associated with the signal delay through the multiplexer circuitry (e.g., FIG. 2 element 210, and illustrated by arrow 326 of FIG. 3A); and $T_{D\_AMP}$ is the delay time component associated with the signal delay through the amplifier and sampling circuitry (e.g., FIG. 2 element 208, and as illustrated by arrow 328 in FIG. 3A). Similarly for the downstream measurement:

$$T_{RX2} = T_{D\_XDRC2} + T_{D\_MUX} + T_{D\_AMP} \quad (7)$$

where $T_{D\_XDRC2}$ is the delay time component associated with the signal delay through transducer 2 (illustrated by arrow 328 of FIG. 3B); $T_{D\_MUX}$ is the delay time component associated with the signal delay through the multiplexer circuitry (e.g., FIG. 2 element 210, and as illustrated by arrow 332 of FIG. 3B); and $T_{D\_AMP}$ is the delay time component associated with the signal delay through the amplifier and sampling circuitry (e.g., FIG. 2 element 208, and as illustrated as arrow 334 in FIG. 3B).

Substituting the various components making up the upstream measured time ($T_{D\_UP}$) and downstream measured time ($T_{D\_DOWN}$) into equation (1), the Delta Time becomes:

$$\text{Delta Time} = (T_{TX2} + T_{FLIGHT\_UP} + T_{RX1}) - (T_{TX1} + T_{FLIGHT\_DOWN} + T_{RX2}) \quad (8)$$

Substituting the components of the delay time associated with transmit and receive paths into equation (8), Delta Time becomes:

$$\text{Delta Time} = ((T_{D\_DRV2} + T_{D\_XDCR2}) + T_{FLIGHT\_UP} + (T_{D\_XDRC1} + T_{D\_MUX} + T_{D\_AMP})) - ((T_{D\_DRV1} + T_{D\_XDCR1}) + T_{FLIGHT\_DOWN} + (T_{D\_XDCR2} + T_{D\_MUX} + T_{D\_AMP})) \quad (9)$$

Mathematically, many of terms cancel, leaving:

$$\text{Delta Time} = T_{D\_DRV2} + T_{FLIGHT\_UP} - T_{D\_DRV1} - T_{FLIGHT\_DOWN} \quad (10)$$

Now assume that there is no fluid flow in the meter. With this assumption, the actual time of flight for each of the downstream ($T_{FLIGHT\_DOWN}$) and upstream ($T_{FLIGHT\_UP}$) measurements should be equal, and it mathematically follows:

$$\text{Delta Time} = T_{D\_DRV2} - T_{D\_DRV1} \quad (11)$$

In the situation then where there is no fluid flow and the Delta Time should be zero, the Delta Time reduces to the difference in the delay time components between the upstream and downstream drivers. Of course, the contribution to the Delta Time by the delay time components associated with the transducer drivers is also present in situations were fluid flow is present.

Figure 4:
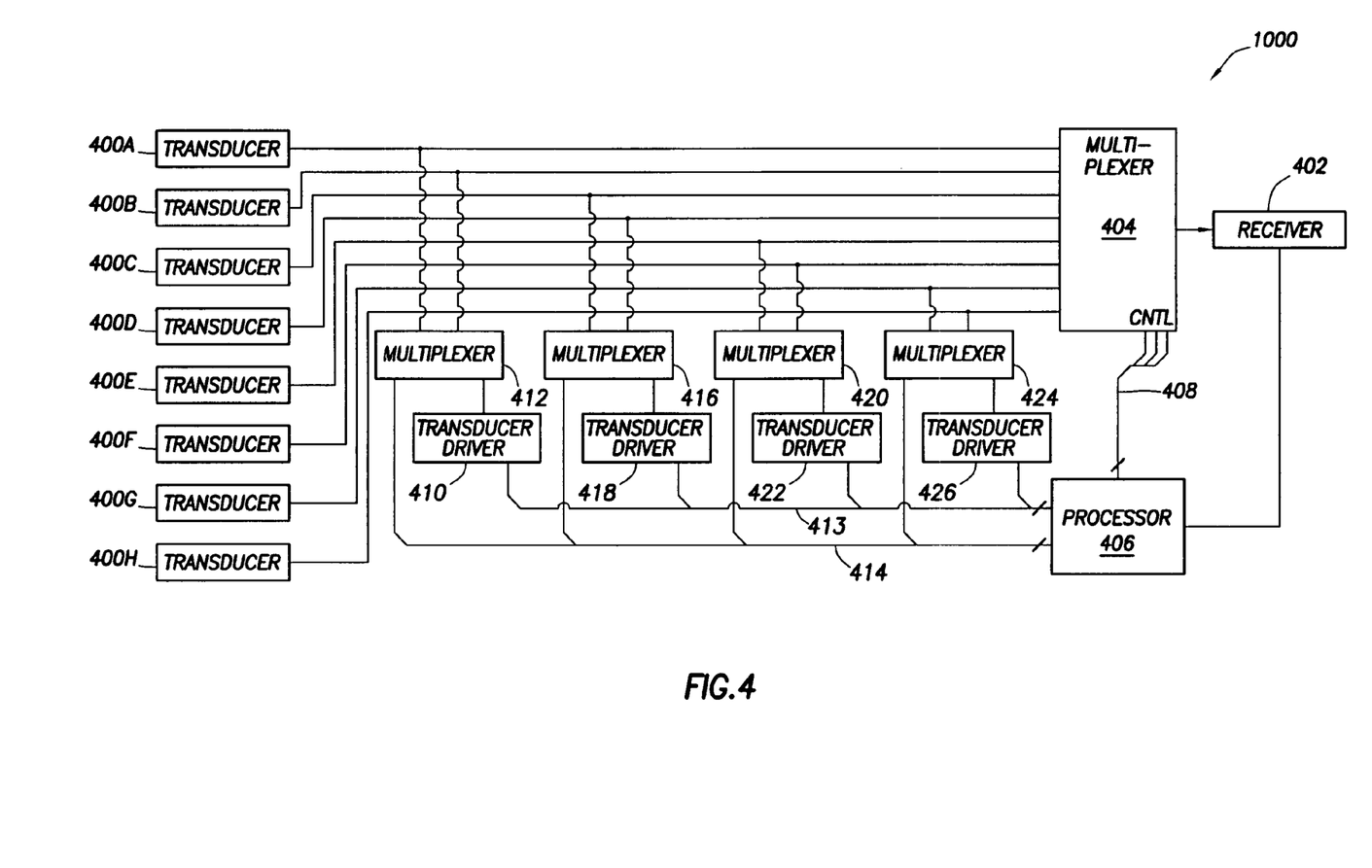
FIG. 4 illustrates an electrical block diagram of an ultrasonic meter in accordance with at least some embodiments.

In order to address this difficulty, various embodiments of the invention use the same transducer driver for both the upstream and downstream measurements along a chordal path. Using the same transducer driver for each transducer, $T_{D\_DRV2} = T_{D\_DRV1}$, and therefore, from equation (11), Delta Time should equal zero for the no flow condition. In other words, using the same transducer driver allows the delay time component associated with the transducer drivers to cancel. FIG. 4 illustrates, in block diagram form, an ultrasonic meter 1000 in accordance with at least some embodiments. In particular, the ultrasonic meter 1000 comprises a plurality of transducers 400A-400H. Although eight transducers are shown, greater or fewer transducers may be equivalently used. Each transducer 400 couples to a receiver circuit 402 through a 1 to N multiplexer 404. The receive circuit 402 receives electrical signals created by an ultrasonic signal impinging on the piezoelectric element of a transducer and amplifies and detects the signals. Processor 406 sends control signal across the control signal lines 408 to selectively couple each transducer 400 to the receiver circuit 402 when that transducer is acting to "catch" in the "pitch and catch" operation described above. The processor may be a standalone processor or a microcontroller. In other embodiments, the functionality of the processor may be implemented by way of a programmable logic device (PLD), field programmable gate array (FPGA), application specific integrated circuit (ASIC), or the like.

In accordance with the embodiments illustrated in FIG. 4, each transducer pair shares a transducer driver. Transducer drivers may take many forms. In some embodiments, each transducer driver may comprise electrical circuitry to generate and amplify alternating current (AC) signals that are then applied to their respective transducers to induce vibration and therefore ultrasonic signals. In these embodiments, the transducer drivers may operate at the command of the processor 406 sending control signals along the control signal lines 413. In alternative embodiments, the transducer drivers may amplify AC signals provided to them by the processor 406 (and possible other devices), the signals likewise provided over the control signal lines 413.

Still referring to FIG. 4, transducer driver 410 couples to multiplexer 412, which selectively couples the transducer driver 410 to transducers 400A or 400B. Transducer driver 418 couples to multiplexer 416, which selectively couples the transducer driver 418 to transducers 400C or 400D. Transducer driver 422 couples to multiplexer 420, which selectively couples the transducer driver 422 to transducers 400E or 400F. Finally, transducer driver 426 couples to multiplexer 424, which selectively couples the transducer driver 426 to transducers 400G or 400H. Each of the multiplexers also couples to the processor 406 by way of control signal line 414. The multiplexers are controlled by programs executing on the processor 406.

Thus, in the embodiments illustrated by FIG. 4, Delta Time errors associated with differences in delay time as between transducer drivers are reduced or eliminated by sharing a transducer driver among transducers of a transducer pair. In these embodiments, the number of transducer drivers is reduced by half over ultrasonic meters where each transducer has its own transducer driver. In further embodiments, a single transducer driver may be shared by all the transducers, not only reducing or eliminating Delta Time errors associated with the transducer drivers, but also reducing the number of components to implement the ultrasonic meter.

Figure 5:
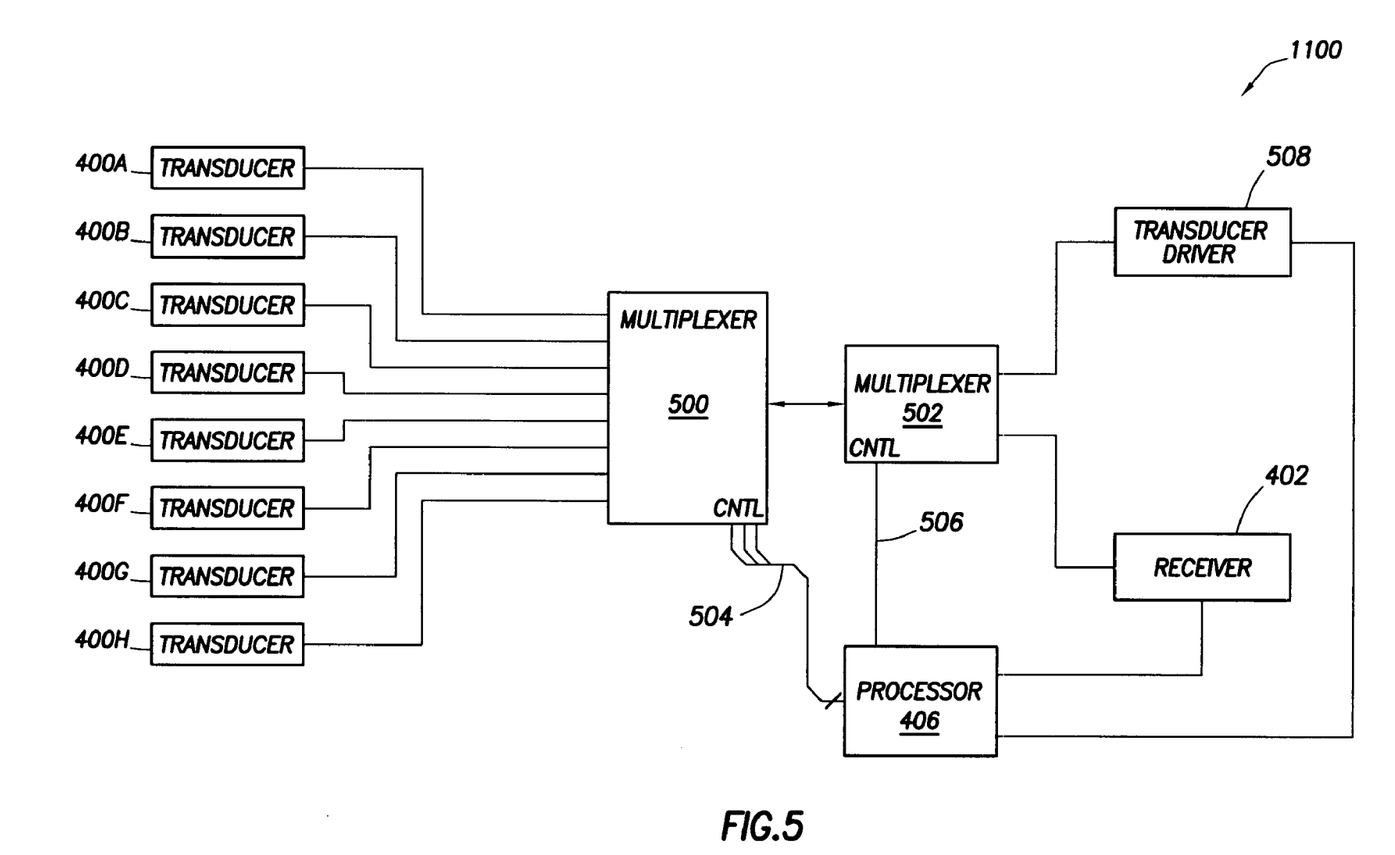
FIG. 5 illustrates an electrical block diagram of an ultrasonic meter in accordance with alternative embodiments.

FIG. 5 illustrates, in block diagram form, embodiments of an ultrasonic meter 1100 in accordance with alternative embodiments. In particular, the ultrasonic meter 1100 comprises a plurality of transducers 400A-400H. Although eight transducers are shown, greater or fewer transducers may be equivalently used. Each transducer 400 couples to a receiver circuit 402 through two multiplexers: a 1 to N multiplexer 500; and a 1 to 2 multiplexer 502. Each multiplexer 500 and 502 couples to processor 406 by control signal lines 504 and 506 respectively. Under control of programs executing on the processor 406, the processor 406 can selectively couple each transducer 400 to the receiver circuit 402 when that transducer is acting to "catch" in the "pitch and catch" operation.

FIG. 5 further illustrates a single transducer driver 508 used for all the transducers 400. In particular, each transducer 400 couples to the transducer driver 508 through the 1 to N multiplexer 500 and a 1 to 2 multiplexer 502. Under control of programs executing on the processor 406, the processor 406 selectively couples each transducer 400 to the transducer driver 508 when that transducer is acting to "pitch" in the "pitch and catch" operation.

Figure 6:
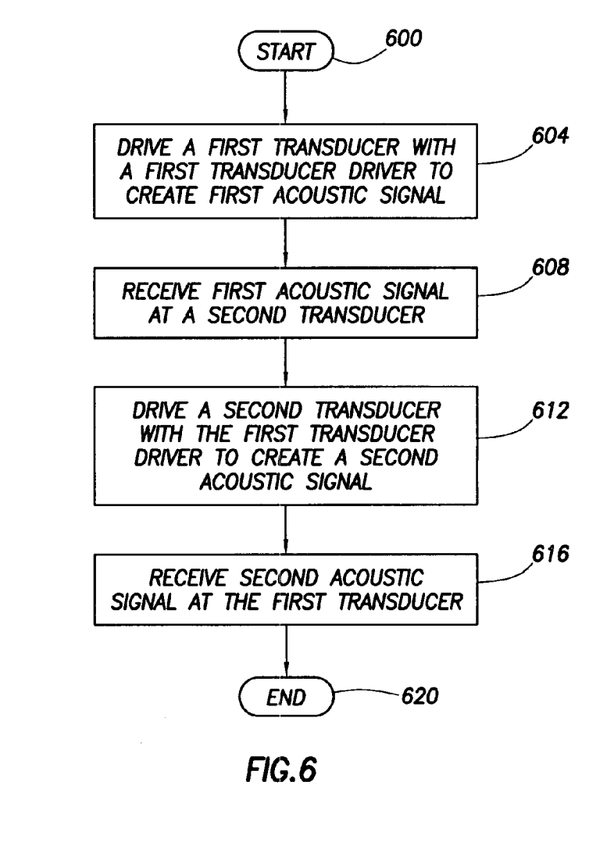
FIG. 6 illustrates a method in accordance with embodiments of the invention.

FIG. 6 illustrates a method in accordance with embodiments of the invention. In particular, the method starts (block 600), and proceeds to driving a first transducer with a first transducer driver to create a first acoustic signal (block 604). The first acoustic signal is received by a second transducer (block 608). Then in the illustrative method moves to driving a second transducer with the first transducer driver to create a second acoustic signal (block 612). Finally, the second acoustic signal is received by the first transducer (block 616), an the illustrative process ends (block 620). As noted above, driving both the first and second transducers with the same transducer driver reduces or eliminates Delta Time errors associated with having different transducer drivers for each transducer.

While various embodiments of this invention have been shown and described, modifications thereof can be made by one skilled in the art without departing from the spirit or teaching of this invention. The embodiments described herein are exemplary only and are not limiting. For example, while ultrasonic meters are described, any common signal path in any electronic device could benefit from the embodiments herein. Moreover, while the various embodiments are described with respect to an ultrasonic meter have an "X" shaped path for ultrasonic signals, this is not specifically required, and other patterns, including reflected paths, are within the contemplation of this disclosure. Further still, the various configurations described can be applied to any number of transducer pairs and the signal can be single-ended or differential. Accordingly, the scope of protection is not limited to the embodiments described herein, but is only limited by the claims which follow, the scope of which shall include all equivalents of the subject matter of the claims.

What is claimed is:

1. An ultrasonic meter comprising:
    a spool piece configured to couple within a flow of fluids;
    a first upstream transducer mechanically coupled to the spool piece;
    a first downstream transducer mechanically coupled to the spool piece, the first downstream transducer in operational relationship to the first upstream transducer;
    a transducer driver configured to drive the first upstream transducer and the first downstream transducer;
    a receiver circuit;
    a first multiplexer coupled to the first upstream transducer and the first downstream transducer; and
    a second multiplexer coupled between the first multiplexer, and the transducer driver and the receiver circuit;
    wherein the first multiplexer and the second multiplexer are configured to selectively couple the transducer driver to the first upstream transducer and the first downstream transducer; and
    wherein the first multiplexer and the second multiplexer are configured to selectively couple the receiver circuit to the second upstream transducer and the first downstream transducer.

2. The ultrasonic meter as defined in claim 1 further comprising:
    a second upstream transducer mechanically coupled to the spool piece; and
    a second downstream transducer mechanically coupled to the spool piece, the second downstream transducer in operational relationship to the second upstream transducer;
    wherein the transducer driver is configured to drive the second upstream transducer and the second downstream transducer;

wherein the first multiplexer and the second multiplexer are configured to selectively couple the transducer driver to the second upstream transducer and the second downstream transducer; and wherein the first multiplexer and the second multiplexer are configured to selectively couple the receiver circuit to the second upstream transducer and the second downstream transducer.

3. The ultrasonic meter as defined in claim 1 wherein the first multiplexer and the second multiplexer are configured to couple the transducer driver to the first upstream transducer, then uncouple the first upstream transducer from the transducer driver and couple the receiver circuit to the first downstream transducer.

4. A method comprising:
coupling a first transducer to a transducer driver through a first multiplexer and a second multiplexer for a predetermined amount of time;
creating a first acoustic signal in a fluid by driving the first transducer with the transducer driver;
decoupling the first transducer from the transducer driver by way of the first multiplexer and the second multiplexer;
receiving the first acoustic signal at a second transducer;
coupling the second transducer to the transducer driver through the first multiplexer and the second multiplexer for a predetermined amount of time;
creating a second acoustic signal in the fluid by driving a second transducer with the transducer driver;
decoupling the second transducer from the transducer driver by way of the first multiplexer and the second multiplexer; and
receiving the second acoustic signal at the first transducer.

5. The method as defined in claim 4 further comprising:
coupling a third transducer to the transducer driver through the first multiplexer and the second multiplexer for a predetermined amount of time;
creating a third acoustic signal in the fluid by driving the third transducer with transducer driver;
decoupling the third transducer from the transducer driver by way of the first multiplexer and the second multiplexer;
receiving the third acoustic signal at a fourth transducer;
coupling a fourth transducer to the transducer driver through the first multiplexer and the second multiplexer for a predetermined amount of time;
creating a fourth acoustic signal in the fluid by driving the third transducer with the transducer driver;
decoupling the fourth transducer from the transducer driver by way of the first multiplexer and the second multiplexer; and
receiving the fourth acoustic signal at a third transducer.

6. The method as defined in claim 4 further comprising:
wherein receiving the first acoustic signal further comprises coupling the second transducer to a receiver circuit through the first multiplexer and the second multiplexer; and
wherein receiving the second acoustic signal further comprises coupling the first transducer to the receiver circuit through the first multiplexer and the second multiplexer.

7. An ultrasonic meter comprising:
a means for fluidly coupling the ultrasonic meter within a flow of fluids;
a first means for generating acoustic signals in the fluid, the first means for generating mechanically coupled to the means for fluidly coupling;
a second means for generating acoustic signals in the fluid, the second means for generating mechanically coupled to the means for fluidly coupling, and the second means for generating in operational relationship to the first means for generating;
a means for driving, that drives the first means for generating and the second means for generating;
a means for receiving signals;
a first means for selectively coupling coupled to the first means for generating and the second means for generating; and
a second means for selectively coupling coupled between the first means for selectively coupling, and the means for driving and the means for receiving;
wherein the first means for selectively coupling and the second means for selectively coupling selectively couple the means for driving to the first means for generating and the second means for generating; and
wherein the first means for selectively coupling and the second means for selectively coupling selectively couple the means for receiving to the first means for generating and the second means for generating.

8. The ultrasonic meter as defined in claim 7 further comprising:
a third means for generating acoustic signals coupled to the means for fluidly coupling; and
a fourth means for generating acoustic signals coupled to the means for fluidly coupling, the fourth means for generating in operational relationship to the third means for generating;
wherein the means for driving drives the third means for generating and the fourth means for generating;
wherein the first means for selectively coupling and the second means for selectively coupling selectively couple the means for driving to the third means for generating and the fourth means for generating; and
wherein the first means for selectively coupling and the second means for selectively coupling selectively couple the means for receiving signals to the third means for generating and the fourth means for generating.

9. The ultrasonic meter as defined in claim 7
wherein the first means for selectively coupling and the second means for selectively coupling couple the means for driving to the first means for generating, then uncouple the first means for generating from the means for driving and couple the means for receiving signals to the second means for generating.

10. The ultrasonic meter as defined in claim 7 further comprising:
wherein the first means for selectively coupling and the second means for selectively coupling selectively couple the means for receiving to the first means for generating and the second means for generating.

* * * * *

UNITED STATES PATENT AND TRADEMARK OFFICE
CERTIFICATE OF CORRECTION

PATENT NO. : 7,290,455 B2 Page 1 of 1
APPLICATION NO. : 11/361107
DATED : November 6, 2007
INVENTOR(S) : Keith V. Groeschel

It is certified that error appears in the above-identified patent and that said Letters Patent is hereby corrected as shown below:

In Column 8, line 55 of the patent:

"the second upstream transducer", should read --the first upstream transducer--.

Signed and Sealed this

First Day of December, 2009

David J. Kappos
*Director of the United States Patent and Trademark Office*